(12) United States Patent
Chen et al.

(10) Patent No.: US 10,159,122 B2
(45) Date of Patent: Dec. 18, 2018

(54) SYSTEM AND METHOD FOR EMULATING A GAS DISCHARGE LAMP

(75) Inventors: Nan Chen, Hong Kong (CN); Shu-Hung Henry Chung, Hong Kong (HK)

(73) Assignee: CITY UNIVERSITY OF HONG KONG, Kowlooon (HK)

( * ) Notice: Subject to any disclaimer, the term of this patent is extended or adjusted under 35 U.S.C. 154(b) by 1058 days.

(21) Appl. No.: 13/530,544

(22) Filed: Jun. 22, 2012

(65) Prior Publication Data

US 2013/0342128 A1    Dec. 26, 2013

(51) Int. Cl.
*H05B 33/08* (2006.01)
*H05B 37/02* (2006.01)

(52) U.S. Cl.
CPC ........ *H05B 33/0809* (2013.01); *Y02B 20/383* (2013.01)

(58) Field of Classification Search
CPC .... H05B 33/00; H05B 33/08; H05B 33/0809; H05B 37/00; H05B 37/02; Y02B 20/00; Y02B 20/383; Y02B 20/342; Y02B 20/386; Y02B 20/204; Y02B 20/206; Y02B 20/325
USPC ................................... 315/193, 291, 209 SC
See application file for complete search history.

(56) References Cited

U.S. PATENT DOCUMENTS

| | | | | |
|---|---|---|---|---|
| 4,342,948 A | * | 8/1982 | Samuels | H05B 41/042 307/157 |
| 5,059,870 A | * | 10/1991 | Choon | H05B 41/046 315/101 |
| 2009/0058312 A1 | * | 3/2009 | Weijs | H05B 33/0803 315/193 |
| 2009/0212721 A1 | * | 8/2009 | Maruyama | H05B 33/0812 315/307 |
| 2010/0102749 A1 | * | 4/2010 | Wilken | H05B 41/231 315/291 |
| 2011/0260633 A1 | * | 10/2011 | Takeda | H05B 33/0815 315/192 |
| 2013/0279182 A1 | * | 10/2013 | Ivo | F21K 9/00 362/382 |
| 2015/0054416 A1 | * | 2/2015 | Radermacher | H05B 33/0806 315/200 R |

FOREIGN PATENT DOCUMENTS

WO   WO 2011050597 A1 *  5/2011   ............. F21V 23/02
WO   WO 2012052875 A2 *  4/2012   ......... H05B 33/0809

* cited by examiner

*Primary Examiner* — Tung X Le
*Assistant Examiner* — Henry Luong
(74) *Attorney, Agent, or Firm* — Renner Kenner Greive Bobak Taylor & Weber

(57) ABSTRACT

A system and method for emulating a gas discharge lamp comprising an input arranged to direct electric current from a lamp ballast to a delay circuit, wherein the delay circuit is arranged to establish an electrical communication between the lamp ballast and an electric lamp when a predetermined condition associated with one or more characteristics of the gas discharge lamp is attained.

10 Claims, 3 Drawing Sheets

SYSTEM AND METHOD FOR EMULATING A GAS DISCHARGE LAMP

TECHNICAL FIELD

The present invention relates to a circuit for an electric lamp apparatus and particularly, although not exclusively, to a circuit for operating a non gas discharge lamp with a ballast of a gas discharge lamp.

BACKGROUND

Gas discharge lamps, including high pressure discharge lamps, low pressure discharge lamps (domestic florescent lamps) or sodium vapour street lamps are popular lighting solutions in many domestic and commercial environments. Part of its popularity is due to its relative low cost, long life and high efficiency which has seen gas discharge lamps being installed in various buildings, vehicles, aircraft and government infrastructure.

More recently, modern forms of lighting technologies have become increasingly popular as developments of lighting solutions continue. Examples of these modern forms of lighting include Light Emitting Diodes (LEDs) arrays, which are safer, more controllable, longer lasting and more efficient. These modern lighting systems are gradually replacing many traditional applications of gas discharge lamps in buildings and vehicles. However, a hurdle being faced by users of these modern forms of lighting is that existing electrical infrastructure may not be suitable to operate these lighting solutions. This is because many of these lighting solutions have completely different electrical characteristics when compared with gas discharge lamps and in some cases, the fact that many of these lighting systems work with regulated Direct Current power supplies, new infrastructure such as power supplies, wiring, ballasts and the like must also be installed. This inturn increases the costs of upgrading to more modern forms of lighting technology and has forced many decision makers to continue to use less efficient lighting technologies.

SUMMARY OF THE INVENTION

In accordance with a first aspect of the present invention there is provided a system for emulating a gas discharge lamp comprising: an input arranged to direct electric current from a lamp ballast to a delay circuit, wherein the delay circuit is arranged to establish an electrical communication between the lamp ballast and an electric lamp when a predetermined condition associated with one or more characteristics of the gas discharge lamp is attained.

In an embodiment of the first aspect, the predetermined condition associated with the characteristics of the gas discharge lamp is associated with the duration of a breakdown phase of the gas discharge lamp.

In an embodiment of the first aspect, the electric lamp is a retrofit electric lamp arranged to replace the gas discharge lamp.

Preferably in one embodiment, the retrofit electric lamp is either a direct-current-driven (such as LED, OLED, incandescent) or an alternating-current-driven lamp (ac-driven LED).

In another embodiment the retrofit electric lamp is not a gas discharge lamp.

In an embodiment of the first aspect, the delay circuit includes a delay portion and a switch portion electrically connected with the delay portion.

In an embodiment of the first aspect, the delay portion is arranged to receive the electric current from the input so as to generate a gradual increase in voltage across a switch portion, whereupon the voltage across the switch portion reaches a predetermined level, the switch portion is arranged to transmit the electric current to the electric lamp.

In an embodiment of the first aspect, the delay portion is a RC circuit arranged to use a capacitor to generate the gradual increase in voltage across a switch portion when the delay circuit is energized.

In an embodiment of the first aspect, the switch portion includes a TRIAC component arranged to establish electrical communication between the lamp ballast and the electric lamp when the voltage across the switch portion reaches a predetermined level.

In an embodiment of the first aspect, the switch portion further includes a DIAC component.

In an embodiment of the first aspect, the TRIAC component is controlled by the DIAC component to establish the electrical communication between the lamp ballast and the electric lamp.

In an embodiment of the first aspect, the electric lamp comprises an array of one or more light emitting diodes.

In accordance with a second aspect of the present invention, there is provided a method for emulating a gas discharge lamp comprising the steps of: directing an electric current received from a lamp ballast to a delay circuit, wherein the delay circuit is arranged to establish an electrical communication between the lamp ballast and an electric lamp when a predetermined condition associated with one or more characteristics of the gas discharge lamp is attained.

In an embodiment of the second aspect, the predetermined condition associated with the characteristics of the gas discharge lamp is associated with the duration of a breakdown phase of the gas discharge lamp.

In accordance with a third aspect of the present invention, there is provided an emulation system for a lighting circuit comprising:

an input arranged to direct electric current from a lamp ballast to a delay circuit, wherein the delay circuit is arranged to resist the electric current from being delivered to the electric lamp until a predetermined condition is reached whereupon the predetermined condition is reached, the electric current is transmitted to the electric lamp by the delaying circuit.

In an embodiment of the third aspect, the predetermined condition is a predetermined time period.

In an embodiment of the third aspect, the predetermined time period is associated with a breakdown phase of the electric lamp.

In an embodiment of the third aspect, the delay circuit includes a delay portion and a switch portion.

In an embodiment of the third aspect, the delay portion is arranged to receive the electric current from the input so as to generate a gradual increase in voltage across a switch portion, whereupon the voltage across the switch portion reaches a predetermined level, the switch portion is arranged to transmit the electric current to the electric lamp.

In accordance with a fourth aspect of the present invention, there is provided a circuit arrangement for connecting a non gas discharge electric lamp to a gas discharge electric lamp ballast comprising:

a delay circuit arranged to receive an electric current from the lamp ballast;

resisting the transmission of the electric current to the non gas discharge electric lamp until a predetermined condition is reached; and when the predetermined condition is reached, an electrical communication is established between the electric lamp and the ballast.

In an embodiment of the fourth aspect, the predetermined condition is associated with a duration of a breakdown phase associated with a gas discharge electric lamp corresponding to the ballast.

In an embodiment of the fourth aspect, the delay circuit further comprises one or more inductors.

In an embodiment of the fourth aspect, the one or more inductors is arranged to receive a preheating current from the gas discharge electric lamp ballast.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
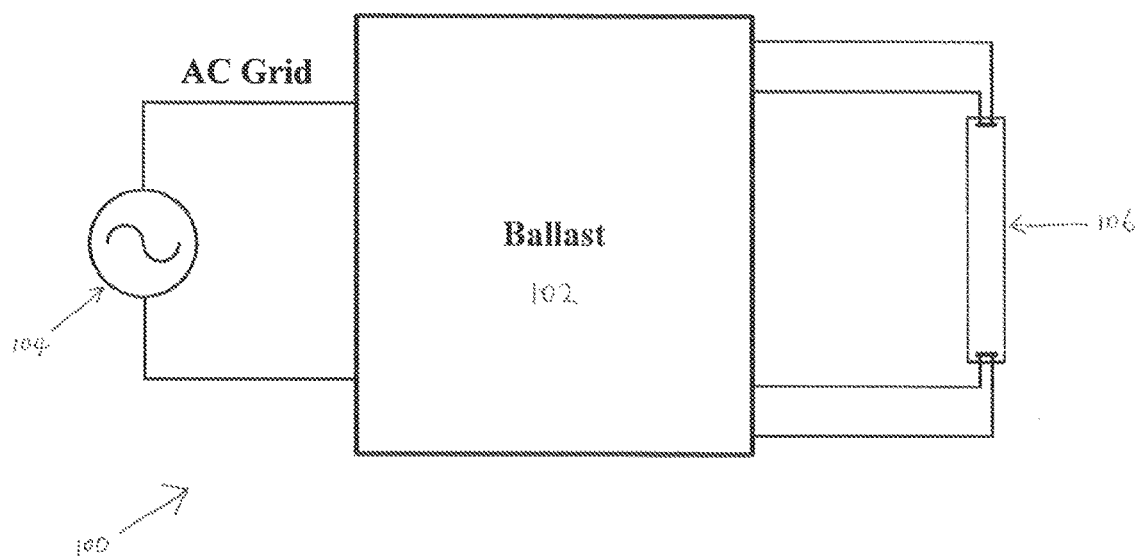
FIG. 1 is a block diagram of a gas discharge lamp circuit comprising a lamp ballast and a gas discharge lamp element.

Referring to FIG. 1, there is illustrated a block diagram of a gas discharge lamp circuit 100 for starting and operating a gas discharge lamp. In this embodiment, the circuit 100 comprises a lamp ballast 102 arranged to receive a Alternating Current (AC) power source 104 and regulates this AC power supply for transmission to a gas discharge lamp element 106, which may include any type of lamp element or apparatus wherein the illumination is generated by electric discharge into ionized gas.

The lamp ballast 102, which as a person skilled in the art would appreciate, may be arranged to provide a number of functions, including the control and regulation of an electric current which is provided to the gas discharge lamp element 106 so as to ensure the lamp does not draw excessive current from the AC power source due to negative resistance characteristics. The ballast 102 may also be designed so as to operate with a starting phase of the gas discharge lamp element, and may be programmed to regulate the correct amount of electric current to the lamp element so as to expect a specific duration for the "nonconductive" state of the gas discharge lamp during the start up phase and to regulate a correct amount of electric current to the lamp element once the lamp reaches a steady operation state post successful start up.

In the example shown in FIG. 1, the circuit 100 is arranged to start the gas discharge lamp 106 from an "off" state. As gas discharge lamps operate in relations with the gaseous substances within the lamp, unlike an incandescent light bulb or LED, a starting process must first be initiated so as to start the lamp. This starting process of a gas discharge lamp may be referred to as a sequence of gas discharge phases. The first of these phases is referred to as the "breakdown phase" in which the gases within the lamp element 106 (or lamp tube) is converted from a nonconductive state to a conductive state by electrical breakdown.

After a period of time, this phase will generally be completed. Following the completion of this phase, the lamp cathode and element/tube is then fully heated up by a process referred to as the "thermionic low pressure arc" phase. Finally, what follows is the lamp gas would reach the steady-state operation pressure and temperature, and the ballast 102 could reach its rated operation power.

In some examples, lamp ballasts 102 may be implemented to include certain detection and protection functions installed within their control scheme of the start-up process. This is so that the ballast is able to protect itself in case of sudden removal of the lamp element or the sudden short circuit of its output. As these unique features are included within an electronic ballast for a gas discharge lamp, if the lamp element was replaced with a retrofitted lighting system, which may include different type of gas discharge lamp with different starting and operation characteristics, or if the lamp was replaced with a non gas discharge type (such as an LED array or incandescent lighting system), then the electronic ballast would also need to be replaced to suit the replaced lighting system. This is because the original lamp ballast may only operate with specific characteristics of a gas discharge lamp and therefore, would only be expecting to operate with a start up phase and steady state of a gas discharge lamp to which it was designed for. In the event that these specific characteristics are not detected by the ballast, the ballast may fail to supply electrical current, or that safety features of the ballast may be triggered to terminate its supply of regulated electric current.

Figure 2:
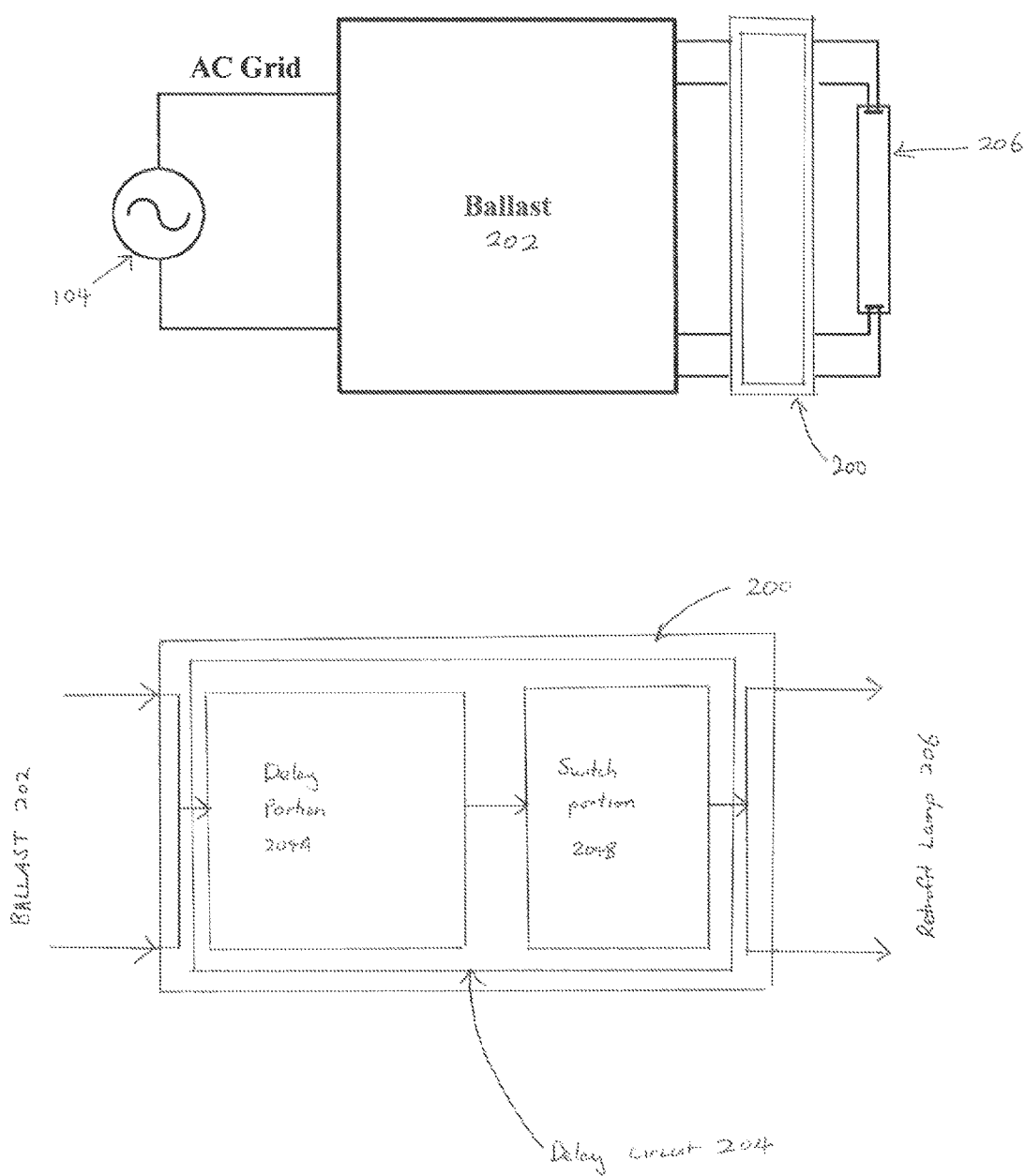
FIG. 2 is a block diagram of a system for emulating a gas discharge lamp for operation with the ballast of FIG. 1 so that a retrofit electric lamp is powered by the ballast.

As shown in FIG. 2, there is illustrated an embodiment of an electronic ballast having a system for emulating a gas discharge lamp 200 arranged such that the electronic ballast may operate with a retrofitted electronic lamp which does not have the characteristics of a gas discharge lamp associated with the existing lamp ballast 202. The retrofit lamp 206, may include gas discharge lamps of different characteristics or preferably, lamps which are not gas discharge lamps but have other illumination means such as Light Emitting Diodes (LED) or incandescent lighting systems is used to directly replace the gas discharge lamp element.

As shown in FIG. 2, an embodiment of the system for emulating a gas discharge lamp 200 comprises: an input arranged to direct electric current from a lamp ballast to a delay circuit 204, wherein the delay circuit 204 is arranged to establish an electrical communication between the lamp ballast 202 and an electric lamp 206 when a predetermined condition associated with one or more characteristics of the gas discharge lamp is reached.

In this embodiment, the delay circuit 204 is arranged to emulate the physical behaviours of a gas discharge lamp which has been replaced by the retrofit lamp 206 from the ignition phase to the steady state. Thus, when the delay circuit 104 is coupled to operate with a retrofit lamp 206 (such as LED lighting arrays) which does not share the characteristics of the gas discharge lamp which it replaces, the lamp ballast 202 is nonetheless able to undertake the procedures of the ignition phase to the steady state and thus allow the lamp ballast 202 to operate with the retrofit lamp 206 without further modification or replacement.

In one example, the delay circuit 204 is arranged to emulate the characteristics of the gas discharge lamp by introducing a delay in the delivery of electric current from the ballast to the retrofit electric lamp 206. This delay ideally is similar to the time and electrical characteristics required of the nonconductive state of the gas discharge lamp. By introducing this delay, the ballast 202 is "fooled" into operating with the retrofit lamp 206, which may not have any of these nonconductive states of the gas discharge lamp.

To generate this delay, in one example embodiment, the delay circuit 204 includes a delay portion 204A and a switch portion 204B which is in electrical communication with each other. As shown in FIG. 2, the delay portion 204A is arranged to receive electric current from the ballast and in turns generates a change in voltage across components of the switch portion 204B. Once the voltage reaches a certain predetermined threshold, usually after a predetermined period of time preferably similar to the "breakdown" phase of the gas discharge lamp, the switch portion 204B is arranged to close the circuit so that the electric current can be transmitted to the retrofit electric lamp element 206. Thus the delay circuit 204 has the effect of creating a delay similar in time and electrical characteristics to that of the starting phase (breakdown phase) of the gas discharge lamp even though the retrofit electric lamp element 206 may not have any of these characteristics. Embodiments and implementations of the delay circuit 204 are further described with reference to FIG. 3 below.

Figure 3:
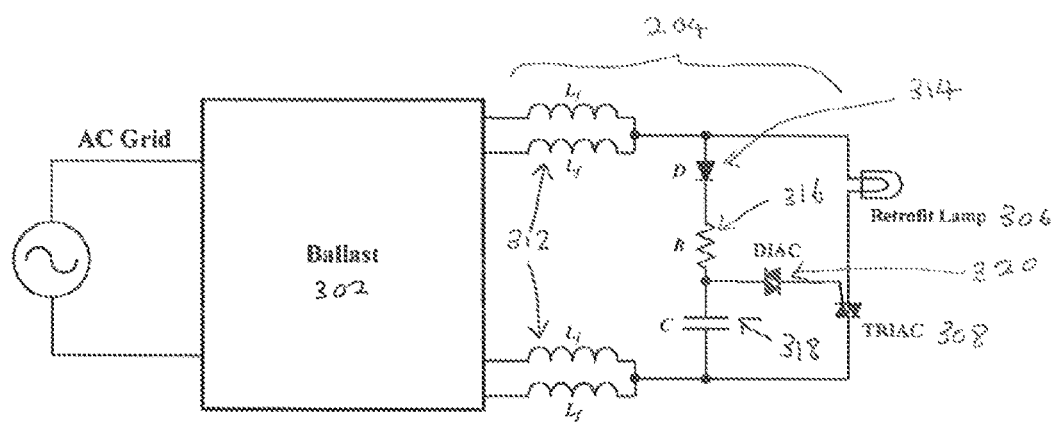
FIG. 3 is a wiring diagram of one embodiment of a system for emulating a gas discharge lamp.

With reference to FIG. 3, there is illustrated a wiring diagram of a ballast 302, retrofit electric lamp 306 and one embodiment of a system for emulating a gas discharge lamp comprising a delay circuit 204. In this embodiment, the delay circuit 204 includes a Resistor-Capacitor arrangement to form a delay portion which is in electrical connection with a switch portion comprising a bidirectional triode thyristor or bilateral triode thyristor or more commonly known as a Triode for Alternating Current (TRIAC) 308 to keep the output of ballast in an open circuit state for a predetermined period of time (e.g. few milliseconds) to emulate the nonconductive state of a gas discharge lamp. Once a predetermined condition is met, the TRIAC will be turned on by the Diode for Alternating Current (DIAC) component to conduct and enable the retrofit lamp 306 to operate in a steady state. In one embodiment, active components are used for the circuit 204 to increase the reliability and life time of the system for emulating a gas discharge lamp.

In this embodiment, the control circuit for TRIAC includes a diode D 314 (which may preferably be a fast recovery diode so as to handle high frequency from the lamp ballast), a resistor R 316, a film capacitor C 318 and a DIAC 320. The control process operates through the following steps during a lamp Start-up process:

1. Once the lamp ballast is switched on by a user, voltage through C 318 is zero and DIAC 320 maintains a blocked state. This results in the gate voltage of TRIAC 308 being zero and therefore the TRIAC is not conducting;

2. D 314 functions to rectify the output voltage of ballast, the rectified voltage is charging C through R, and thus the voltage across C is increasing gradually, before reaching the break-over voltage of DIAC. DIAC keeps blocking and TRIAC is in off state in this process, which will take a few milliseconds; and 3. When the voltage across C reaches breakdown voltage of DIAC, DIAC turns into conduction state, so the gate voltage of TRIAC is high and it is turned on.

Once the TRIAC is turned on, electric current from the lamp ballast 302 is transmitted to the retrofit lamp 306, and in turns energizes the lamp 306. Thus in the processes outlined above, the delay circuit 204 has emulated the start up phases of a gas discharge lamp to which the ballast 302 would have anticipated in its design, and thus, able to energize the lamp 306 without the ballast failing to activate the lamp or triggering one or more safety features of the ballast to terminate its supply of regulated electric current.

In some examples where a lamp ballast includes a preheating function which provides a ac voltage to heat up the lamp filaments, four small inductors Lf 312 are used to emulate the lamp filaments which are being preheated. These are advantageous in that the inductors 312 can be used for limiting the circulating currents produced by the ballast's preheating voltage.

These embodiments are advantageous in that existing light fittings and circuits for gas discharge lamps, such as florescent lighting commonly found in offices, garages and buildings, does not need to be replaced so as to allow non gas discharge lamps, or gas discharge lamps of different characteristics to be used. This is because the start up phase implemented in the ballast of these gas discharge lamps are able to work with the retrofit lamps as additional circuits, which can be implemented as an add-on or integrated within the retrofit lamp can simulate the start up processes of a gas discharge lamp and thus allows existing light fittings, wiring and ballasts to work with the new lighting systems.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for emulating a gas discharge lamp comprising the steps of:

directing an electric current received from a lamp ballast to a delay circuit, wherein the delay circuit is arranged to establish an electrical communication between the lamp ballast and an electric lamp when a predetermined condition associated with one or more characteristics of the gas discharge lamp is attained after a delay introduced by the delay circuit; wherein the delay circuit includes a TRIAC component connected in series with the electric lamp and arranged to maintain an output of the lamp ballast in an open circuit state within the delay so as to emulate a nonconductive state of the gas discharge lamp, and to establish the electrical communication after the delay, wherein the TRIAC component is further arranged to maintain a steady and conductive state of an operation of the electric lamp.

2. The method in accordance with claim 1, wherein the predetermined condition associated with the one or more characteristics of the gas discharge lamp is associated with a duration of a breakdown phase of the gas discharge lamp.

3. The method in accordance with claim 1, wherein the electric lamp is a retrofit lamp arranged to replace the gas discharge lamp.

4. The method in accordance with claim 1, wherein the delay circuit includes a delay portion and a switch portion electrically connected with the delay portion.

5. The method in accordance with claim 4, wherein the delay portion is arranged to receive the electric current from an input so as to generate a gradual increase in voltage across the switch portion, whereupon the voltage across the switch portion reaches a predetermined level, the switch portion is arranged to transmit the electric current to the electric lamp.

6. The method in accordance with claim 5, wherein the delay portion is a RC circuit arranged to use a capacitor to generate the gradual increase in voltage across the switch portion when the delay circuit is energized.

7. The method in accordance with claim 5, wherein the switch portion provides the TRIAC component, the TRIAC component arranged to establish electrical communication between the lamp ballast and the electric lamp when the voltage across the switch portion reaches the predetermined level.

8. The method in accordance with claim 6, wherein the switch portion further includes a DIAC component.

9. The method in accordance with claim 8, wherein the TRIAC component is controlled by the DIAC component to establish the electrical communication between the lamp ballast and the electric lamp.

10. The method in accordance with claim 1, wherein the electric lamp comprises an array of one or more light emitting diodes.

\* \* \* \* \*